United States Patent [19]
Lee

[11] Patent Number: 6,075,345
[45] Date of Patent: Jun. 13, 2000

[54] BATTERY POWERED ELECTRONIC SYSTEM WITH AN IMPROVED POWER MANAGEMENT

[75] Inventor: Chang-Hum Lee, Kyunggi-do, Rep. of Korea

[73] Assignee: SamSung Electronics Co., Ltd., Suwon, Rep. of Korea

[21] Appl. No.: 09/301,541

[22] Filed: Apr. 29, 1999

[30] Foreign Application Priority Data

Apr. 29, 1998 [KR] Rep. of Korea ................. 98-15305

[51] Int. Cl.$^7$ .................................................. H01M 10/46
[52] U.S. Cl. ............................................................ 320/138
[58] Field of Search ........................... 320/117, 127, 320/128, 134, 135, 136, 138, 162, 163; 307/18, 19, 43, 46, 48, 65, 66

[56] References Cited

U.S. PATENT DOCUMENTS

| | | |
|---|---|---|
| 5,184,025 | 2/1993 | McCurry et al. . |
| 5,200,685 | 4/1993 | Sakamoto . |
| 5,539,299 | 7/1996 | Fernandez et al. ............... 320/163 |
| 5,578,876 | 11/1996 | Crampton . |
| 5,592,030 | 1/1997 | Adahan . |
| 5,715,156 | 2/1998 | Yilmaz et al. . |
| 5,789,900 | 8/1998 | Hasegawa et al. ............... 320/132 |
| 5,898,234 | 4/1999 | Kitagawa ....................... 320/128 X |

*Primary Examiner*—Edward H. Tso
*Attorney, Agent, or Firm*—Robert E. Bushnell, Esq.

[57] ABSTRACT

Disclosed herein is a battery powered computer system which comprises a switch circuit and a battery charging circuit. In the switch circuit, a field-effect transistor (FET) is provided which is connected in parallel with a diode for preventing a current back flow from a battery to an alternating current (AC) adaptor. When the alternating current adaptor is supplying power, the field-effect transistor is turned on so that most of a current from the alternating current adaptor is delivered to a power supply line through the transistor instead of the diode. Similarly, in the battery charging circuit, a field-effect transistor is implemented which is connected in parallel with a diode for preventing a current back flow from the battery to the alternating current adaptor. When the battery is charged, the field-effect transistor is turned on so that most of a charging current is transferred to the battery through the transistor instead of the diode. According to the above-described arrangement of the switch and battery charging circuits, because the current from the alternating current adaptor passes through the respective transistors of the circuits, power dissipation and loss by the switch and battery charging circuits can be reduced, and no heat is generated by the diodes.

20 Claims, 6 Drawing Sheets

BATTERY POWERED ELECTRONIC SYSTEM WITH AN IMPROVED POWER MANAGEMENT

CLAIM OF PRIORITY

This application makes reference to, incorporates the same herein, and claims all benefits accruing under 35 U.S.C. §119 from an application for a *Battery Powered Electronic System with an Improved Power Efficiency* earlier filed in the Korean Industrial Property Office on Apr. 29, 1998 and there duly assigned Serial No. 15305/1998.

BACKGROUND OF THE INVENTION

1. Technical Field

The present invention relates to electronic systems, and more particularly, to portable electronic systems having power supplies that use two power sources, for example a battery and an alternating current (AC) adaptor.

2. Related Art

One type of electronic system is a computer system. Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, a printer, and other peripherals. A computer system's main board, which is a printed circuit board known as a motherboard, is used to electrically connect these components together. A computer system can be a desktop computer, a portable computer such as a notebook computer or palm-sized computer, or other type of computer.

The central processing unit is often described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). These three functional parts interact together and determine the power and performance of the microprocessor. The combination of the control unit and the arithmetic-logic unit can be referred to as the central processing unit. Also, the combination of the input/output unit, the control unit, and the arithmetic-logic unit can be referred to as the central processing unit.

One example of non-volatile memory is read only memory (ROM). Information stored in non-volatile memory can remain unchanged even when there is a power failure. The information stored in non-volatile memory will stay there until it is changed. Read only memory is used to store important information such as instructions for the central processing unit. There are different types of read only memory including electrically-erasable-programmable-read-only-memory (EEPROM) chip and flash-read-only-memory (flash-ROM). The flash-ROM can also be referred to as flash memory.

Computer systems include a basic input output system (BIOS) which is an especially important program stored in read only memory. The basic input output system tests a computer every time the computer is powered on. The basic input output system can allocate a computer system's resources automatically, making adjustments needed to accommodate new hardware. Also, the basic input output system governs how system board components interact.

When the computer system is powered on, the basic input output system immediately takes control of the computer system and its components. The first duty of the basic input output system is to perform a series of diagnostic routines called the power on self test (POST) routine, which ensures that every part of the computer system's hardware is functioning properly.

An electronic system, such as a computer system, can receive power from two or more sources. For example, the electronic system can be connected to a first power source which is an alternating current (AC) power source supplying alternating current power and can be also connected to a second power source which is a battery supplying a direct current (DC) power. One potential setup would allow the electronic system to receive power from the AC power source when the AC power source is available, and to receive power from the battery at times when the AC power source is not available. In view of this configuration, there is an urgent need for an efficient power control arrangement in order to prevent a wasteful flow of a reverse current that might otherwise be caused by a voltage difference between the two power sources.

I have found that an inefficient use of power in electronic systems can be extremely inconvenient and wasteful. Efforts have been made to improve a supply of power in electronic systems.

Exemplars of recent efforts in the art include U.S. Pat. No. 5,200,685 for adapter for external battery and battery system issued to Sakamoto, U.S. Pat. No. 5,184,025 for computer-controlled uninterruptible power supply issued to McCurry et al., U.S. Pat. No. 5,578,876 for unique computer power system with backup power issued to Crampton, U.S. Pat. No. 5,715,156 for method and apparatus for providing AC or DC power for battery powered tools issued to Yilmaz et al., and U.S. Pat. No. 5,592,030 for power supply for energizing DC load from AC or DC source issued to Adahan.

While these recent efforts provide advantages, I note that they fail to adequately provide a battery powered electronic system with a sufficiently improved power efficiency.

SUMMARY OF THE INVENTION

It is therefore an object of the present invention to provide a battery powered electronic system with an improved power efficiency to thereby reduce a heat generated by diodes for preventing a current back flow. It is also an object of the present invention to provide a battery powered electronic system with a reduced power dissipation and loss to thereby reduce a heat generated by diodes for preventing a current back flow.

In order to attain the above objects, according to an aspect of the present invention, there is provided a battery powered computer system which comprises a switch circuit and a battery charging circuit. The switch circuit comprises a power supply line and a diode coupled in series with the power supply line. The switch circuit further comprises a voltage detector, a switch and a switch controller. The switch is coupled in parallel with the diode, and the switch is provided by a field-effect transistor (FET) having a drop voltage lower than that of the diode. The voltage detector detects whether the voltage of the AC adaptor is higher than a reference voltage, and generates a detection signal as a detection result. The switch controller receives the detection signal, and controls an ON/OFF condition of the switch so as to bring the switch into an ON condition when the voltage of the AC adaptor is higher than the reference voltage.

According to the present invention, the battery charging circuit comprises a diode, a current detector, a switch and a switch controller. The diode is to prevent a current back flow from the battery to the AC adaptor. The switch couples the AC adaptor to the battery, and comprises a field-effect transistor having a drop voltage lower than that of the diode. And, the current detector detects whether a charging current from the AC adaptor is provided, and generates a detection signal as a detection result. The switch controller receives the detection signal, and controls an ON/OFF condition of the switch so as to bring the switch into an ON condition when the charging current from the AC adaptor is provided.

To achieve these and other objects in accordance with the principles of the present invention, as embodied and broadly described, the present invention provides a switching apparatus, comprising: a first input terminal receiving a first power from a first external power supply; an output terminal outputting an output power; a diode having a first terminal and a second terminal, said first terminal being coupled with said first input terminal, said second terminal being coupled with said output terminal; a first switch being coupled in parallel with said diode, said first switch having a drop voltage lower than a drop voltage of said diode; a voltage detector detecting when a voltage of said first power is higher than a reference voltage and generating a detection signal as a result of said detecting; and a first switch controller receiving said detection signal and controlling said first switch in response to said detection signal, said first switch controller switching said first switch on and said first power being conveyed to said output terminal via said first switch when said voltage of said first power is higher than said reference voltage.

To achieve these and other objects in accordance with the principles of the present invention, as embodied and broadly described, the present invention provides a computer system, comprising: a system load including a memory, a direct memory access controller, and at least one peripheral unit; an alternating current adaptor outputting a first power; a battery outputting a second power; a voltage converter being coupled to said system load, said voltage converter controlling a voltage supplied to said system load; a power supply line being coupled to said voltage converter; a diode being coupled in series with said power supply line; a first switch being coupled in parallel with said diode, said first switch having a drop voltage lower than a drop voltage of said diode; a voltage detector detecting when a voltage of said first power is higher than a reference voltage and generating a detection signal as a result of said detecting; a first switch controller receiving said detection signal and controlling said first switch in response to said detection signal, said first switch controller switching said first switch on and said first power being conveyed to said output terminal via said first switch when said voltage of said first power is higher than said reference voltage; a second switch coupling said battery to said system load; and a second switch controller receiving said detection signal and controlling said second switch in response to said detection signal, said second switch controller switching said second switch off and said second power not being conveyed to said system load via said second switch when said voltage of said first power is higher than said reference voltage.

To achieve these and other objects in accordance with the principles of the present invention, as embodied and broadly described, the present invention provides a battery charging apparatus, comprising: a first terminal being coupled to an external power supply; a second terminal being coupled to a battery; a diode coupling said first terminal to said second terminal, said diode preventing a current back flow from said battery to said external power supply; a switch coupling said first terminal to said second terminal, said switch having a drop voltage lower than a drop voltage of said diode, said switch being coupled in parallel with said diode; a current detector detecting a charging current output from said external power supply and generating a detection signal as a result of said detecting; and a switch controller receiving said detection signal and controlling said switch in response to said detection signal, said switch controller switching said switch on and said charging current being conveyed from said external power supply to said battery via said switch when said charging current is detected.

To achieve these and other objects in accordance with the principles of the present invention, as embodied and broadly described, the present invention provides an electrical apparatus, comprising: a first unit outputting a first power; a battery outputting a second power; a charging circuit supplying a charging current from said first unit to said battery; and a switch unit receiving said first power from said first unit and receiving said second power from said battery, said switch unit further comprising: a first input terminal receiving said first power from said first unit; a second input terminal receiving said second power from said battery; an output terminal outputting a power selected from among said first and second powers; a first diode being coupled between said first input terminal and said output terminal; a first switch being coupled in parallel with said first diode, said first switch having a drop voltage lower than a drop voltage of said first diode; a voltage detector detecting when a first voltage of said first power is higher than a reference voltage, and generating a detection signal corresponding to said detecting; and a first switch controller receiving said detection signal and controlling said first switch in response to said detection signal, said first switch controller switching said first switch on and said first power being conveyed to said output terminal via said first switch when said first voltage of said first power is higher than said reference voltage; said charging circuit further comprising: an input connector being coupled to said first unit; an output connector being coupled to said battery; a second switch having a first end being coupled to said input connector and a second end being coupled to said output connector, said second switch coupling said input connector to said output connector, a voltage drop between said first and second ends corresponding to a first voltage drop; a second diode having an anode and a cathode, said diode being coupled to prevent a current back flow from said battery to said first unit, a voltage drop between said anode and said cathode corresponding to a second voltage drop, said first voltage drop being lower than said second voltage drop; a current sensor sensing when said charging current from said first unit is provided, and generating a sensor signal corresponding to said sensing; and a second switch controller receiving said sensor signal and controlling said second switch in response to said sensor signal, said second switch controller switching said second switch on and said charging current being conveyed from said first unit to said battery via said second switch when said charging current is sensed.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being abroad, teaching disclosure directed to persons of skill in the appropriate arts, and not as limiting upon the present invention.

Figure 1:
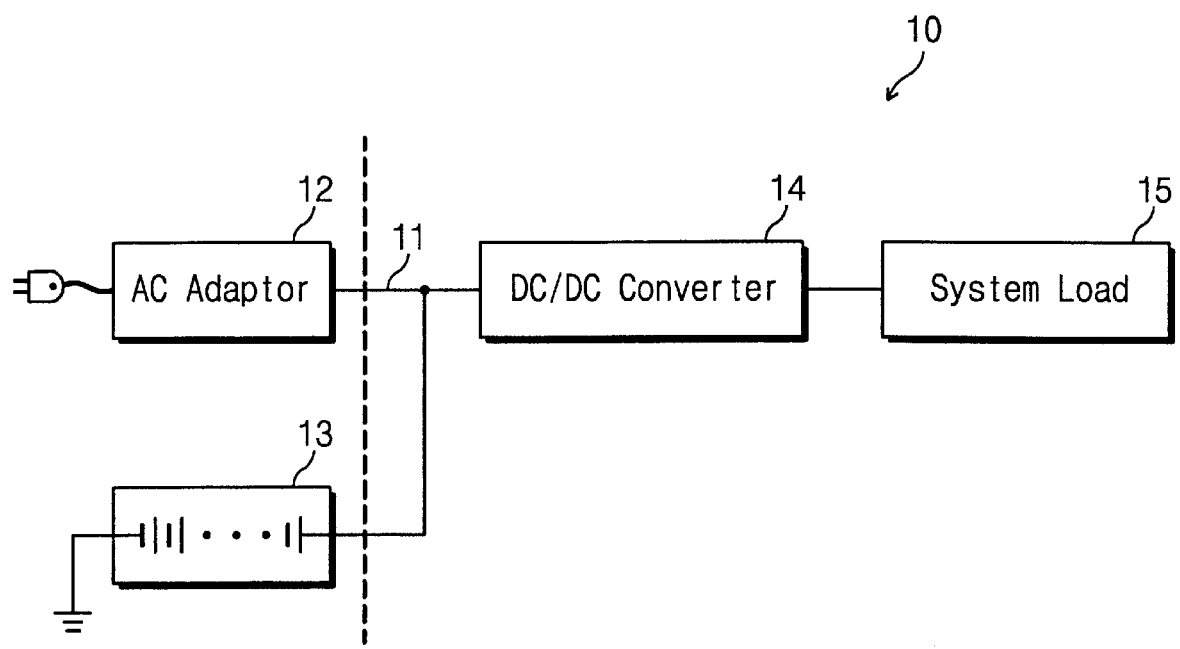
FIG. 1 shows a schematic diagram of an electronic system having a power supply unit.

Turn now to FIG. 1, which shows a schematic diagram of an electronic system having a power supply unit. In FIG. 1, power for the electronic system 10 is supplied by an external power source through a power adaptor, that is, an alternating current (AC) adaptor 12, or by a chargeable battery 13, or by a secondary battery. The AC adaptor 12 is a device that converts an AC voltage from an external power source into a direct current (DC) voltage. The AC adaptor 12 is connected via the power supply line 11 to a DC/DC converter 14 within the electronic system 10. The DC/DC converter 14 is a device that controls the voltage that is supplied to the system load 15. More specifically, the DC/DC converter 14 is coupled to both the AC adaptor 12 and the battery 13.

The DC/DC converter 14 reduces the voltage of the external power source, or the voltage of the battery 13, to a constant voltage level that is appropriate for the operation of the system load 15. In other words, the DC/DC converter 14 reduces the voltage of the AC adaptor 12, for example 19 volts (V), to a constant voltage level that is appropriate for the operation of the system load 15, for example 5 volts or 3.3 volts. In addition, the DC/DC converter 14 reduces the voltage of the battery 13, for example 7.4 volts to 15 volts, to a constant voltage level that is appropriate for the operation of the system load 15, for example 5 volts or 3.3 volts.

The system load 15 represents the component in the electronic system 10 that consumes power and is driven by constant DC voltage, which is supplied by the DC/DC converter 14. If the electronic system 10 is a notebook computer, then a central processing unit (CPU), a memory, a display, or individual peripherals are included as part of the system load 15.

In an electronic system that receives, in parallel, the output voltages of the AC adaptor 12 and the battery 13, means are required to prevent the flow of a reverse current that would otherwise be caused by a voltage difference between the two power sources. In particular, when the battery 13 is supplying power, means must be provided to prevent a current back flow from the battery 13 to the AC adaptor 12 via the power supply line 11 . Such a current reversal would result in a wasteful power consumption by a circuit in the AC adaptor 12, and the power of the battery 13, which has a finite capacity, would be expended uselessly.

Into the power supply line 11 of the AC adaptor 12, a diode can be inserted such that the normal direction of current flow is from the AC adaptor 12 to the DC/DC converter 14. Therefore, when the output voltage of the battery 13 is higher than that of the AC adaptor 12, a back flow of current into the AC adaptor 12 can be prevented.

Suppose that the diode is Schottky diode or a fast recovery diode. Since the voltage drop in the forward direction for the Schottky diode is relatively low, this diode can effectively reduce the power that is wasted. For example, the voltage drop in the forward direction for the Schottky diode might be 0.4 volts to 0.5 volts. However, at a high temperature, reverse current through the Schottky diode is increased, so that the prevention of reverse current flow is not effective. On the other hand, although the voltage drop of a fast recovery diode in the forward direction is large, current back flow is substantially lower when compared with that for a Schottky diode, even at high temperatures. For example, the voltage drop of a fast recovery diode in the forward direction might be 0.8 volts to 1.0 volts.

Thus, a fast recovery diode can be used for diode. A fast recovery diode, however, may become overheated because the voltage drop in the forward direction causes considerable power consumption. For example, with a 40 watt (W) AC adaptor 12 outputting a current of 3 amperes (A), the power consumed by a fast recovery diode is 2.4 watts to 3.0 watts, such that a heat sink or a metal plate is required. The power consumed by a fast recovery diode is 3 amperes (amps)×0.8 volts to 1.0 volts. A cooling pan is an example of a heat sink.

As described above, a fast recovery diode or a Schottky diode can be employed to prevent a reverse current flow from the battery 13 to the AC adaptor 12. However, since a heat is generated by each of these diodes, means to discharge this heat is required.

Figure 2:
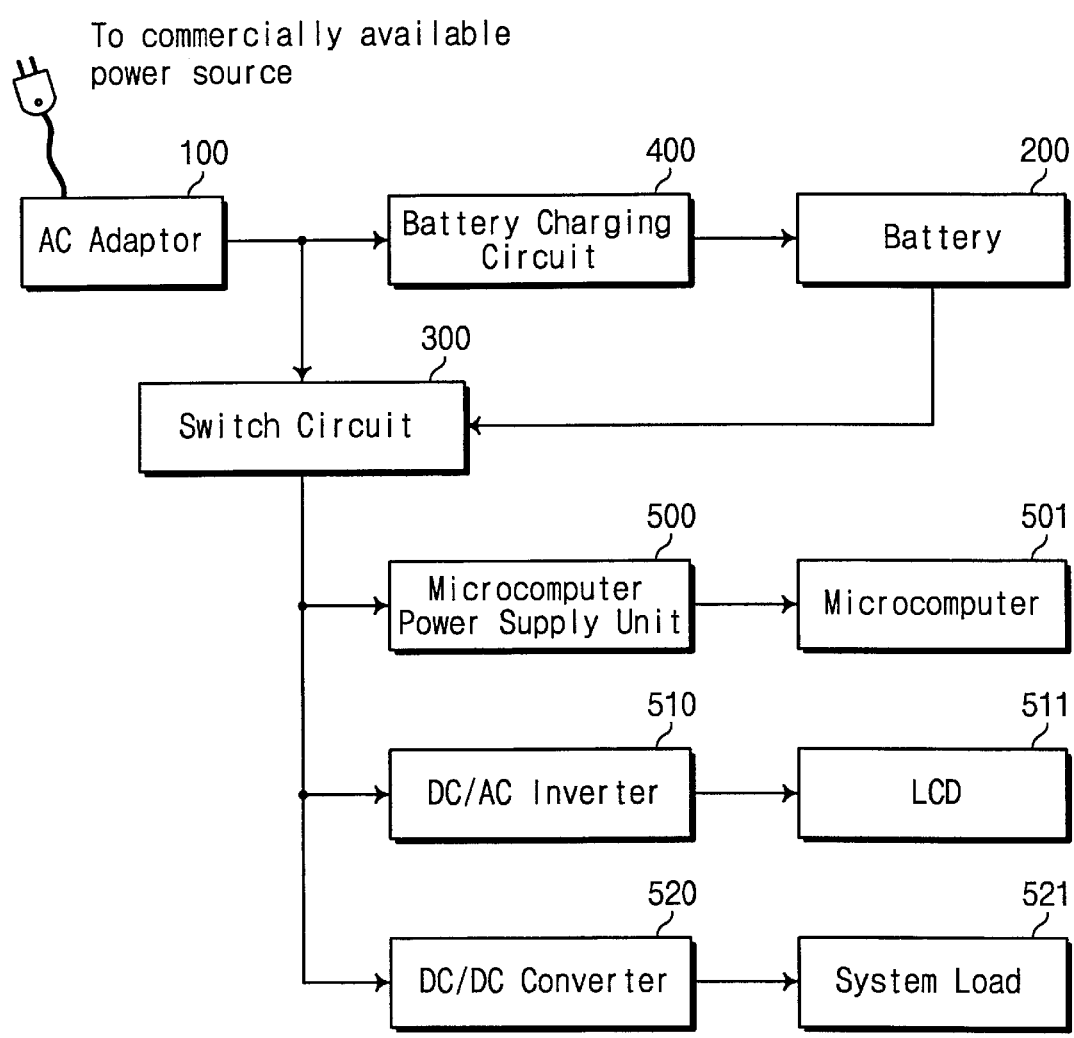
FIG. 2 is a block diagram illustrating the configuration of a computer system used in one embodiment of the present invention, in accordance with the principles of the present invention.

A preferred embodiment of the present invention will now be described referring to the accompanying drawings. Turn now to FIG. 2, which shows a block diagram illustrating the configuration of a computer system used in one embodiment of the present invention, in accordance with the principles of the present invention. In FIG. 2, an AC adaptor 100, connectable to the computer system, is connected to a commercially available external power supply (not shown), and rectifies/smooths an AC voltage from the external power supply to output a DC voltage.

The battery 200 can be recharged or rapidly charged through a battery charging circuit 400, and can be built in the computer system. If the AC adaptor 100 is not connected to the computer system and the battery 200 is built therein instead, a DC voltage is supplied through a switch circuit 300 from the battery 200 to the respective components of the computer system in order to activate the computer system. A nickel-hydrogen battery is used as the battery 200, for example.

As shown in FIG. 2, a microcomputer power supply unit 500, a microcomputer 501, a DC/AC inverter 510, a liquid crystal display (LCD) 511, a DC/DC converter 520, and a system load 521 are further provided in the computer system. Although not shown in the figure, the system load 521 comprises a ROM (read only memory) for storing a control program inherent to the computer system, a RAM (random access memory), a direct memory access controller (DMAC) for performing the direct memory access control, a programmable interrupt controller (PIC) settable by a program, an expansion RAM with a large capacity and connectable to a special card slot, and a backup RAM for storing backup data, etc. to implement a resume function. The liquid crystal display (LCD) 511 can be replaced by other display units such as a cathode ray tube, a gas-plasma display, a light emitting diode display, an electro-luminescent display, or a field emission display.

The switch circuit 300 delivers the DC voltage from the AC adaptor 100 to the respective components of the computer system, or delivers the DC voltage from the battery 200 to the respective components of the computer system. In particular, when the AC adaptor 100 is connected to the computer system, the switch circuit 300 supplies the DC voltage from the AC adaptor 100 for the respective components of the computer system, while it stops supplying the DC voltage from the battery 200 for the microcomputer power supply unit 500, the DC/AC inverter 510, and the DC/DC converter 520. If the AC adaptor 100 is detached from the computer system, the switch circuit 300 supplies the DC voltage from the battery 200 for the microcomputer power supply unit 500, the DC/AC inverter 510, and the DC/DC converter 520.

Figure 3:
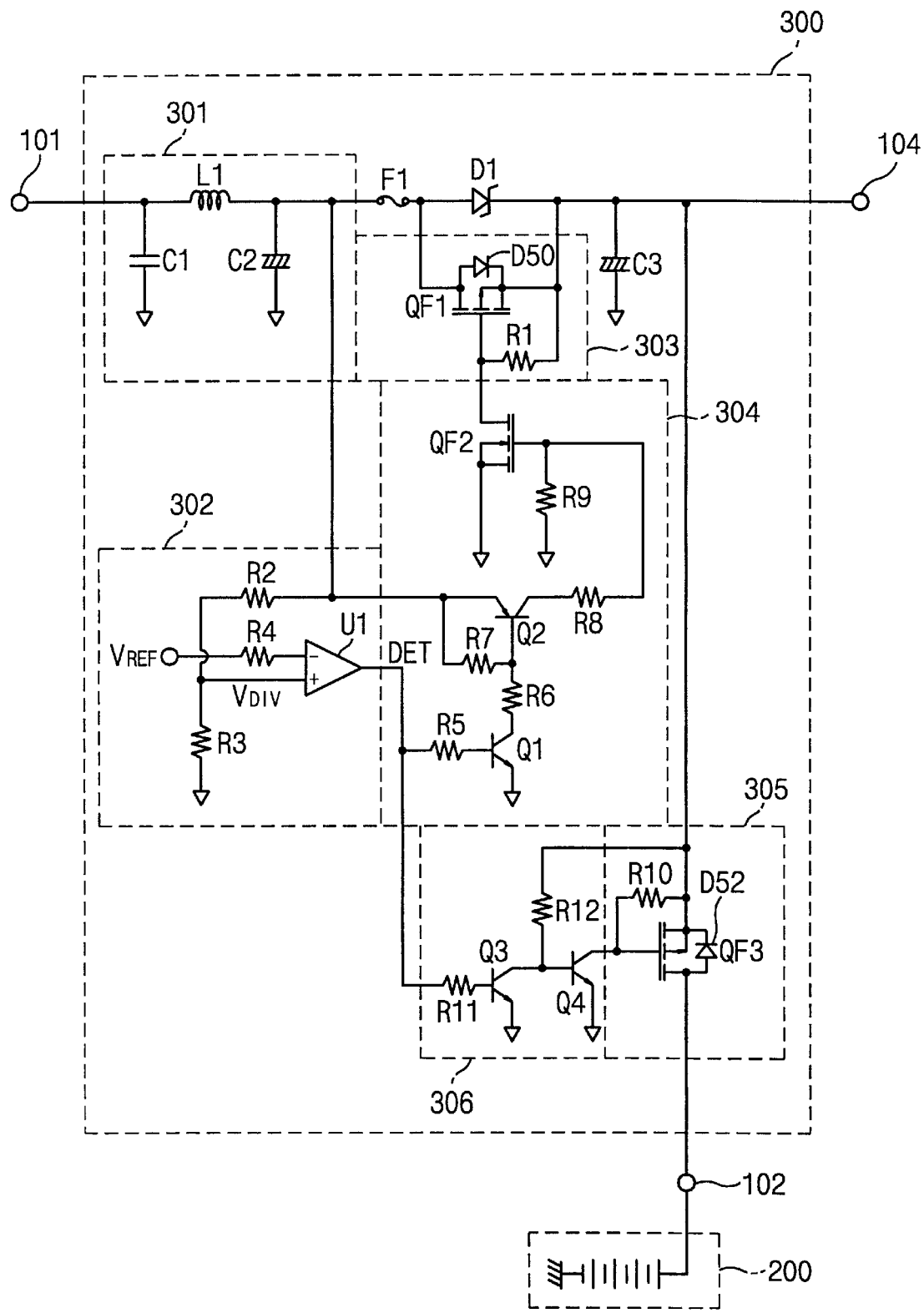
FIG. 3 shows one embodiment of a switch circuit illustrated in FIG. 2, in accordance with the principles of the present invention.

Turn now to FIG. 3, which shows one embodiment of a switch circuit illustrated in FIG. 2, in accordance with the principles of the present invention. FIG. 3 is one embodiment of the switch circuit 300 of FIG. 2, in accordance with the principles of the present invention. The switch circuit 300 has a first input terminal 101 to be connected with the AC adaptor 100, a second input terminal 102 to be connected with the battery 200, and an output terminal 104 (or a power supply line) connected to, for example, the DC/DC converter 520. The switch circuit 300 electrically connects the power supply line 104 to the AC adaptor 100 when the AC adaptor 100 is connected to the input terminal 101. When the AC adaptor 100 is detached from the input terminal 101, the switch circuit 300 electrically connects the power supply line 104 to the battery 200.

The switch circuit 300 comprises a filter 301 coupled to the input terminal 101 and percolating a noise of the DC voltage, a fuse F1 connected to the filter 301 and the power supply line 104 and preventing an overcurrent flowing into the computer system, a diode D1 coupled to the fuse F1 and the power supply line 104 and preventing a current back flow from the battery 200 to the AC adaptor 100. The diode D1 is composed of a Schottky diode or a fast recovery diode.

Continuing to refer to FIG. 3, a voltage detector 302, first and second switches 303 and 305, and first and second switch controllers 304 and 306 are further provided in the switch circuit 300.

The voltage detector 302 in this embodiment comprises three resistors R2, R3 and R4 and an operational amplifier (op amp) U1. The op amp U1 acts as a comparator. One end of the resistor R2 is connected via the filter 301 to the input terminal 101, and the other end of the resistor R2 is connected to the non-inverting input of the op amp U1. Also, the non-inverting input of the op amp U1 is coupled to the ground through the resistor R3. With this arrangement, the resistors R2 and R3 act as a voltage divider so as to supply a division voltage $D_{DIV}$ for the non-inverting input of the op amp U1. Further, the inverting input of the op amp U1 receives a reference voltage $V_{REF}$ through the resistor R4. The reference voltage $V_{REF}$ is a voltage used as a power supply of the microcomputer 501.

When the inverting input voltage $V_{REF}$ of the op amp U1 is higher than the non-inverting input voltage $D_{DIV}$ thereof, the op amp U1 outputs a signal DET of a logic low level as a detection result. When the inverting input voltage $V_{REF}$ of the op amp U1 is lower than the non-inverting input voltage $D_{DIV}$ thereof, the op amp U1 outputs the signal DET of a logic high level. This means that the AC adaptor 100 is supplying power.

The switch 303 in this embodiment is provided by a P-channel power metal-oxide silicon field-effect transistor (MOSFET) QF1 having a drop voltage of about 0.014 volts and a resistor R1. The MOSFET QF1 is also known as transistor QF1 and as FET switch QF1. The drain of the FET switch QF1 is connected to the input terminal 101 via the fuse F1 and the filter 301, the gate thereof is coupled to the corresponding switch controller 304, and the source of the FET switch QF1 is coupled to the power supply line 104. The resistor R1 is coupled to the gate and the source of the FET switch QF1. The drain of the transistor QF1 is coupled to an anode of the diode D1, and the source of the transistor QF1 is connected to a cathode of the diode D1. As shown in FIG. 3, an anode of diode D50 is coupled to the drain of FET switch QF1, and a cathode of diode D50 is coupled to the source of FET switch QF1. The diode D50 represents a parasitic diode.

When the transistor QF1 is not biased, a current from the AC adaptor 100 is transferred via the diode D1 to the power supply line 104, that is, to the computer system. In other words, when the transistor QF1 is turned off, a current from the AC adaptor 100 is transferred via the diode D1 to the power supply line 104, that is, to the computer system.

If the transistor QF1 is biased, almost all the current from the AC adaptor 100 flows to the power supply line 104 via the MOSFET transistor QF1 instead of the diode D1 having a drop voltage of about 0.5 volts. In other words, if the transistor QF1 is turned on, almost all the current from the AC adaptor 100 flows to the power supply line 104 via the MOSFET transistor QF1 instead of the diode D1 having a drop voltage of about 0.5 volts.

Referring to FIG. 3, the first switch controller 304 receives the output signal DET from the voltage detector 302, and controls an ON/OFF condition of the FET transistor QF1 in the switch 303 so as to bring the transistor QF1 into an ON condition when the voltage of the AC adaptor 100 is higher than the reference voltage $V_{REF}$. In other words, the first switch controller 304 is utilized to control the activation and inactivation of the switch circuit 303 in response to the signal DET level from the voltage detector 302. The controller 304 is comprised of five transistors R5 to R9, an N-channel MOSFET QF2, an NPN transistor Q1 and a PNP transistor Q2. The MOSFET QF2 is also known as transistor QF2 and as FET QF2.

One end of the resistor R5 is connected to the voltage detector 302, and the other end thereof is coupled to a base of the transistor Q1 whose emitter is grounded. The collector of the transistor Q1 is connected via the resistor R6 to the base of the transistor Q2, whose emitter is connected to the input terminal 101 through the filter 301. The resistor R7 is connected to the emitter and the base of the transistor Q2.

The transistor QF2 whose gate is connected via the resistor R8 to a collector of the transistor Q2, has a drain coupled to the gate of the transistor QF1 and a source grounded. Further, the gate of the transistor QF2 is grounded via the resistor R9.

When the signal DET from the voltage detector 302 is at a logic low level, that is, the inverting input voltage $V_{REF}$ of the op amp U1 is higher than the non-inverting input voltage $V_{DIV}$, the transistors Q1 and Q2 are turned off. The transistor QF2 is also turned off, so that the bias voltage is not applied between the gate and the source of the transistor QF1. Accordingly, the transistor QF1 is turned off. On the other hand, when the signal DET is at a logic high level, that is, the inverting input voltage $V_{REF}$ of the op amp U1 is lower than the non-inverting input voltage $D_{DIV}$, the transistors Q1 and Q2 are turned on. The transistor QF2 is turned on, and the bias voltage is applied between the gate and the source of the transistor QF1. That is, the transistor QF1 is turned on.

Continuously, between the power supply line 104 and the input terminal 102, the second switch 305 is connected which is comprised of a resistor R10 and a P-channel power MOSFET QF3. The MOSFET QF3 is also known as transistor QF3 and as FET QF3. The source of the transistor QF3 is connected to the power supply line 104 and the drain thereof is connected to the terminal 102. The gate of the transistor QF3 is connected to the second switch controller 306. Further, the gate and the source of the transistor QF3 are connected via the resistor R10 to each other. As shown in FIG. 3, an anode of diode D52 is coupled to the drain of transistor QF3, and a cathode of diode D52 is coupled to the source of transistor QF3. The diode D52 represents a parasitic diode.

The second switch controller 306 receives the output signal DET from the voltage detector 302 and controls an ON/OFF condition of the transistor QP3 in the second switch 305 so as to bring an OFF condition when the voltage of the AC adaptor 100 is higher than the reference voltage $V_{REF}$. The controller 306 is comprised of two resistors R11 and R12 and two NPN transistors Q3 and Q4. The gate of the transistor Q3 is connected to the voltage detector 302 through the resistor R11, the emitter of the transistor Q3 is grounded, and the collector thereof is connected to the gate of the transistor Q4. The emitter of the transistor Q4 is grounded and the collector is coupled to the gate of the transistor QF3. Further, the collector of the transistor Q3 and the gate of the transistor Q4 are coupled via the resistor R12 to the source of the transistor QF3 and the power supply line 104.

When the output signal DET from the voltage detector 302 is at a logic high level, a bias voltage is applied between the base and the emitter of the transistor Q3 and the base of the transistor Q4 is grounded. In other words, when the output signal DET from the voltage detector 302 is at a logic high level and thus the AC adaptor 100 is supplying power, a bias voltage is applied between the base and the emitter of the transistor Q3 and the base of the transistor Q4 is grounded and thus the transistor Q4 is turned off.

At this time, the bias voltage is not applied between the gate and the source, and there is turned off the transistor QF3. As a result, the AC adaptor 100 is supplying power. On the other hand, when the AC adaptor 100 is detached from the terminal 101, that is, the signal DET is at a logic low level, the transistor Q3 is turned off. At this time, since the transistor Q4 is biased through the resistor R12, it is turned on. A bias voltage is applied between the gate and the source, and the transistor QF3 is turned on. Accordingly, a current flows via the turned on transistor QF3 from the battery 200 to the power supply line 104.

An operation of the switch circuit 300 according to the preferred embodiment of the present invention will be more fully described with reference to the accompanying drawings.

When the AC adaptor 100 is detached from the terminal 101, the non-inverting input voltage $D_{DIV}$ of the op amp U1 in the voltage detector 302 is maintained lower than the inverting input voltage $V_{REF}$ of the op amp U1, so that the output signal DET of the op amp U1 becomes logically low. This forces the second switch controller 306 to activate the second switch 305. In particular, since the signal DET is at a logic low level, the transistor Q3 is turned off and the transistor Q4 is turned on as set forth above. The bias voltage is applied between the gate and the source, and the transistor QF3 is turned on. Accordingly, the power supply line 104 is connected to the battery 200.

At this time, the first switch controller 304 forces the first switch 303 to be inactivated. In particular, when the inverting input voltage $V_{REF}$ of the op amp U1 is higher than the non-inverting input voltage $D_{DIV}$, the transistors Q1, Q2 and QF2 are turned off. The bias voltage is not applied between the gate and the source, and the transistor QF1 is turned off. A current flow from the battery 200 to the AC adaptor 100 is interrupted by the diode D1, so that a current back flow from the battery 200 to the AC adaptor 100 will not occur.

On the other hand, when the AC adaptor 100 is connected to the terminal 101, a current from the AC adaptor 100 is first transferred via the diode D1 to the power supply line 104. After a lapse, the non-inverting input voltage $D_{DIV}$ of the op amp U1 in the voltage detector 302 is made higher than the inverting input voltage $V_{REF}$ of the op amp U1, and the op amp U1 outputs the signal DET of a logic high level. This makes the transistor Q3 of the second switch controller 306 turned on and the transistor Q4 turned off. The bias voltage is not applied between the gate and the source, and the transistor QF3 is turned off. Accordingly, the battery 200 stops supplying a current for the power supply line 104.

According to the signal DET of a logic high level from the voltage detector. 302, the transistors Q1, Q2 and QF2 of the first switch controller 304 are turned on as set forth above. Since the bias voltage is applied between the gate and the source, the transistor QF1 is turned on. This makes almost all the current from the AC adaptor 100 flow to the power supply line 104 through the first switch 303 instead of the diode D1. This is because the diode D1 has its drop voltage of about 0.5 volts and the transistor QF1 has its drop voltage of about 0.014 volts.

According to the switch circuit 300 of the embodiment, when a current from the AC adaptor 100 is supplied, first, it flows through the diode D1. And then, the current flows through the transistor QF1 of the switch 303 instead of the diode D1. Therefore, power dissipation and loss by the diode D1 can be reduced, so that there is generated no heat by the diode D1 for preventing a current back flow while the AC adaptor 100 is supplying power. This will be described more filly below.

Figure 4:
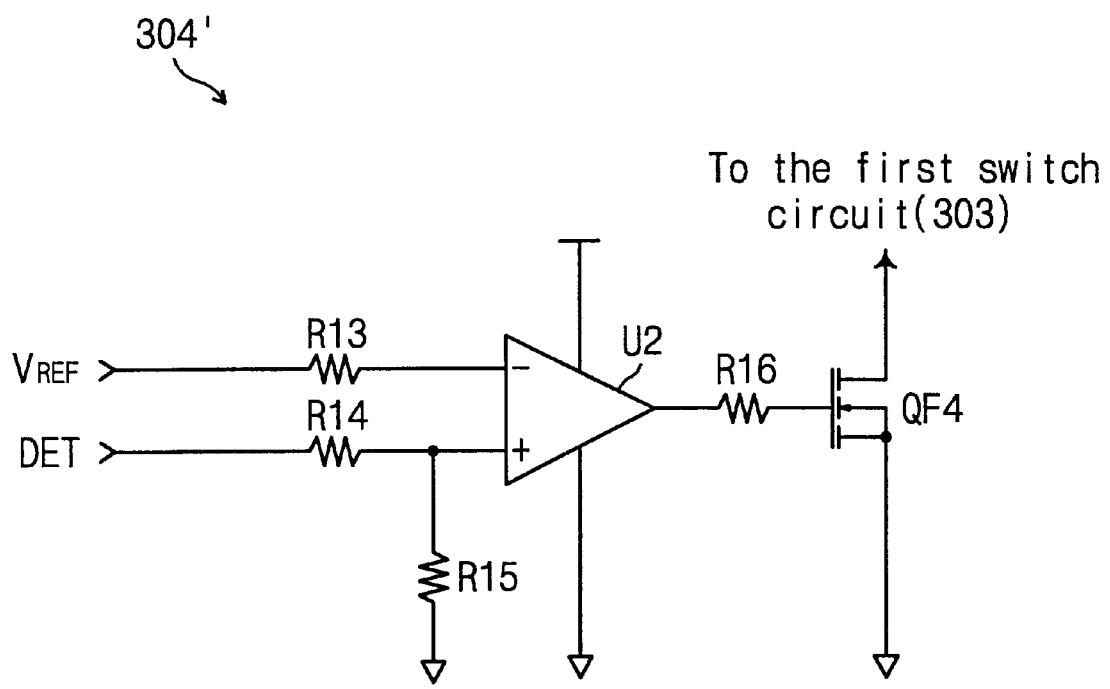
FIG. 4 shows one embodiment of a first switch controller illustrated in FIG. 3, in accordance with the principles of the present invention.

Turn now to FIG. 4, which shows one embodiment of a first switch controller illustrated in FIG. 3, in accordance with the principles of the present invention. Referring to FIG. 4, another embodiment of the first switch controller is illustrated. The first switch controller 304' of the other exemplary embodiment comprises four resistors R13 to R16, one op amp U2 and an N-channel MOSFET QF4 connected as illustrated in FIG. 4.

The voltage $V_{REF}$ is a voltage used as power of the microcomputer 501. When an inverting input voltage $V_{REF}$ of the op amp U2 is higher than a non-inverting input voltage DET thereof, an output of the op amp U2 becomes low and the transistor QF4 is turned off, forcing the first switch 303 to be inactivated. When the inverting input voltage $V_{REF}$ is lower than the non-inverting input voltage DET, the output of the op amp U2 becomes high and the transistor QF4 is turned on, making the first switch circuit 303 activated.

The switch circuit 300 having the switch controller 304' of FIG. 4 performs the same switching operation as that having the switch controller 304 of FIG. 3. The description of the switch circuit 300 having the controller 304' of FIG. 4 is thus omitted.

Figure 5:
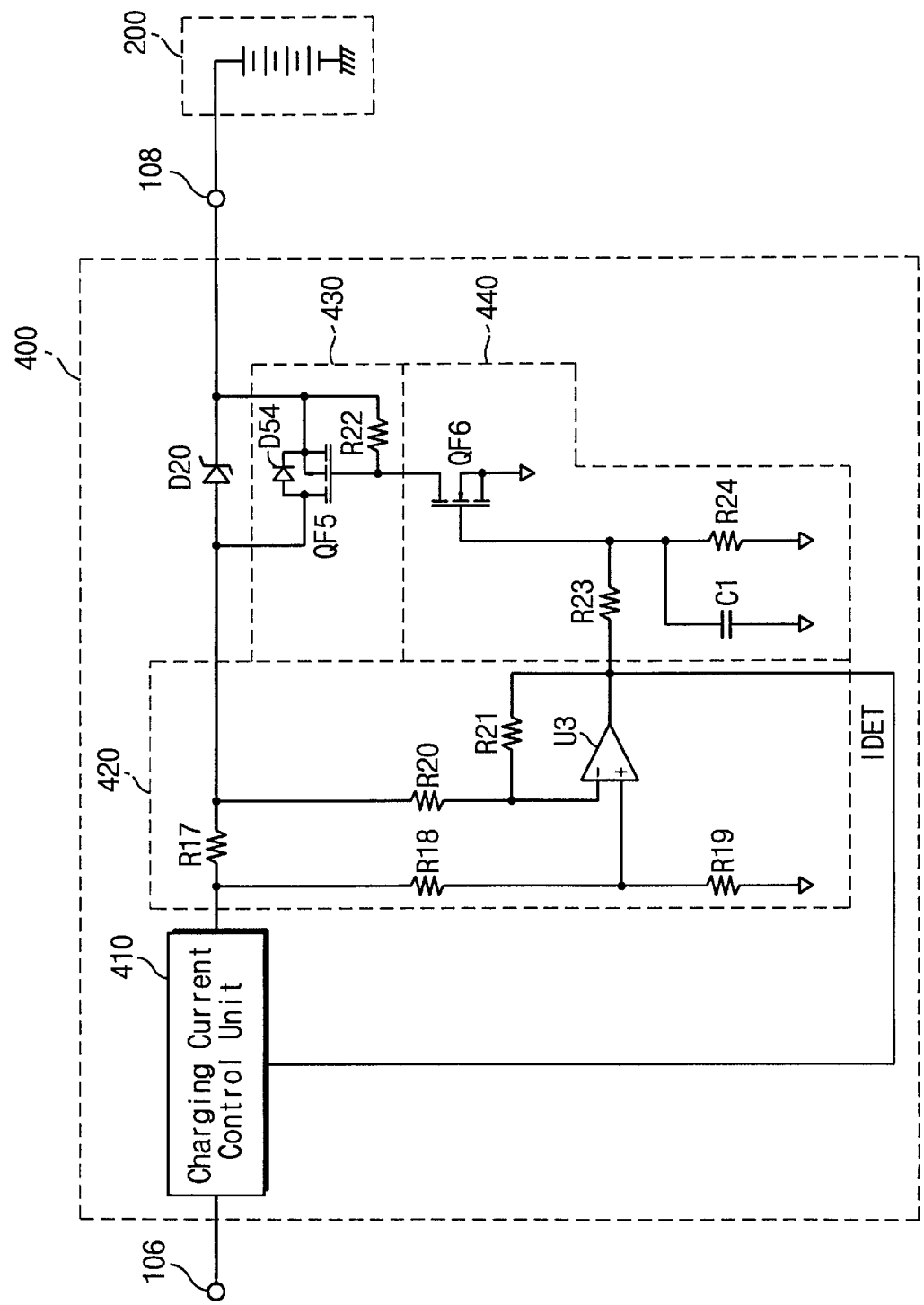
FIG. 5 shows one embodiment of a battery charging circuit illustrated in FIG. 2, in accordance with the principles of the present invention.

Turn now to FIG. 5, which shows one embodiment of a battery charging circuit illustrated in FIG. 2, in accordance with the principles of the present invention. The battery charging circuit 400 in this embodiment comprises an input terminal 106 to be connected to the AC adaptor 100 and an output terminal 108 to be connected to the battery 200. The battery charging circuit 400 start charging the battery 200 with a charging current from the AC adaptor 100. The battery charging circuit 400 comprises a diode D20, a charging current control unit 410, a current detector 420, a switch 430 and a switch controller 440. The input terminal 106 and output terminal 108 can be referred to as an input connector 106 and output connector 108, respectively.

The diode D20 is to prevent a reverse current from the battery 200 to the AC adaptor 100 and has a threshold voltage of about 0.5 volts. For example, the diode D20 is comprised of one selected from the Schottky diode and the fast recovery diode. The charging current control unit 410 is connected to the input terminal 106 and receives the current from the AC adaptor 100 to supply the charging current for the battery 200.

The current detector 420 of this embodiment detects whether the charging current from the s charging current control unit 410 is provided, and generates a signal IDET as a detection result. The signal IDET is used such that the charging current control unit 410 controls the amount of the charging current in accordance with the voltage level of the signal IDET. The current detector 420 comprises a current detection resistor R17 and an operational amplifier (op amp) U3. The current detection resistor R17 is connected in series with the charging current control unit 410, so that it converts the output current from the unit 410 into a voltage value that is proportional to the current.

One end of the current detection resistor R17 is connected via a resistor R18 to the non-inverting input of the op amp U3. The other end of the current detection resistor R17 is connected via a resistor R20 to the inverting input of the op amp U3. With this arrangement, the op amp U3 amplifies the voltages at both ends of the current detection resistor R17. Further, the non-inverting input is connected to GND via a resistor R19, and the output of the op amp U3 is fed back to the inverting input through a resistor R21.

The switch 430 comprises a P-channel power MOSFET QF5 having a drop voltage of about 0.014 volts and one resistor R22. The drain of the transistor QF5 is connected via the current detection resistor R17 to the charging current control unit 410 and the source thereof is connected to the output terminal 108. The gate of the transistor QF5 is connected to the switch controller 440. Further, the gate and the source of the transistor QF5 are connected to each other through the resistor R22. The gate, source, and drain of the transistor QF5 can also be referred to as the three ends of transistor QF5. As shown in FIG. 5 an anode of diode D54 is coupled to the drain of transistor QF5, and a cathode of diode D54 is coupled to the source of transistor QF5. The diode D54 represents a parasitic diode.

Two resistors R23 and R24, one capacitor C1 and an N-channel MOSFET QF6 constitute the switch controller 440. A first end of the resistor R23 is coupled to the output signal IDET from the current detector 420 and a second end of the resistor R23 is connected to the gate of the transistor QF6. The transistor QF6 has its source grounded and its drain connected to the gate of the transistor QF5. Further, the second end of the resistor R23 is also connected to the ground through the capacitor C1 and the resistor R24 which are connected in parallel to each other.

An operation of the battery charging circuit 400 according to the preferred embodiment of the invention will be more fully described with reference to the accompanying drawings.

When the AC adaptor 100 and the battery 200 are connected to the computer system, there is checked a charge status of the battery 200 by means of the exclusive microcomputer for the battery 200. In the case where the battery 200 has to be charged, an operation of charging the battery 200 starts.

Once the battery charging operation starts, first, a charging current from the AC adaptor 100 is supplied to the battery 200 through the input terminal 106, the charging current control unit 410, the current detection resistor R17 and the diode D20. At this time, the current detector 420 detects through the current detection resistor R17 whether the charging current from the charging current s control unit 410 is provided. And then, the current detector 420 output its output signal IDET of a logic high level as a detection result, so that the transistor QF6 of the controller 440 is turned on. The bias voltage is applied between the gate and the source, and the transistor QF5 is turned on. Accordingly, almost all the current from the unit 410 is delivered to the battery 200 through the transistor QF5 of the switch 430 instead of the diode D20.

According to the battery charging circuit 400 of this embodiment, when a current from the AC adaptor 100 is supplied, first, it flows through the diode D20. And then, the current flows through the transistor QF5 of the switch 430 instead of the diode D20. Therefore, power dissipation and loss by the diode D20 can be reduced, so that there is generated no heat by the diode D20 for preventing a current back flow from the battery 200 to the AC adaptor 100 during charging. This will be described more fully below.

Figure 6:
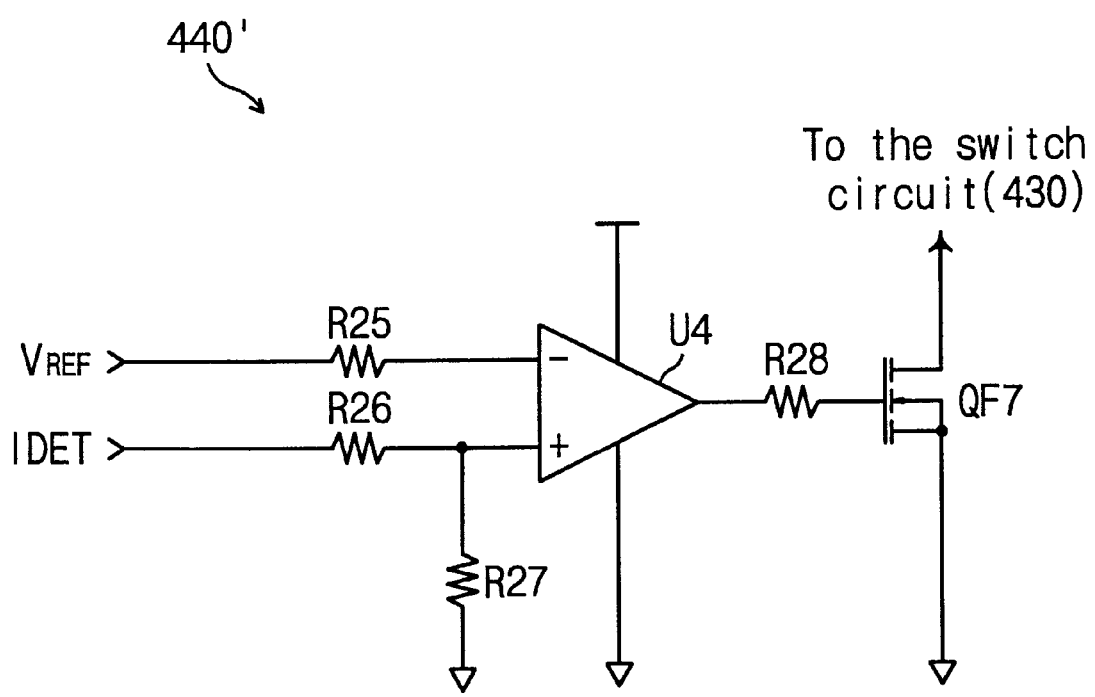
FIG. 6 shows one embodiment of a switch controller illustrated in FIG. 5, in accordance with the principles of the present invention.

Turn now to FIG. 6, which shows one embodiment of a switch controller illustrated in FIG. 5, in accordance with the principles of the present invention. Referring to FIG. 6, another embodiment of the switch controller of the battery charging circuit is illustrated. The switch controller 440' of the other exemplary embodiment comprises four resistors R25 to R28, one op amp U4 and an N-channel MOSFET QF7 connected as illustrated in FIG. 6.

The voltage $V_{REF}$ is a voltage used as power of the microcomputer 501. When an inverting input voltage $V_{REF}$ of the op amp U4 is higher than a non-inverting input voltage IDET thereof, an output of the op amp U4 is at a logic low level and the transistor QF7 is turned off, forcing the switch 430 to be inactivated. When the inverting input voltage $V_{REF}$ is lower than the non-inverting input voltage IDET, the output of the op amp U4 is at a logic high level and the transistor QF7 is turned on, making the switch 430 activated.

The battery charging circuit 400 having the switch controller 440' of FIG. 6 performs the same switching operation as that having the switch controller 440 of FIG. 5. The description of the battery charging circuit 400 having the controller 440' of FIG. 6 is thus omitted.

Suppose that the DC voltage of about 19 volts and the current of about 2.1 amps are supplied from the AC adaptor 100 and that the output wattage of the adaptor 100 is about 39.9 watts. As set forth above, the diodes D1 and D20 of the switch circuit 300 and the battery charging circuit 400 have a drop voltage of about 0.5 volts, respectively. And, the transistors QF1 and QF5 of the switch and battery charging circuits 300 and 400 have a drop voltage of about 0.014 volts, respectively.

Under this condition, a power dissipation $P_{D1}$ by the diode D11 is about 1.05 watts (0.5 volts×2.1 amps), and a power loss rate $\eta_{D1}$ thereby is about 2.63% ((1.05 watts/39.9 watts)×100). On the other hand, a power dissipation $P_{QF1}$ by the transistor QF1 is about 0.0294 watts (0.014 volts×2.1 amps), and a power loss rate $\eta_{QF1}$ thereby is about 0.07% ((0.0294 watts/39.9 watts)×100). By using the switch circuit 300 according to the present invention, a power dissipation is reduced by about 1.0206 watts (1.05 watts−0.0294 watts) and a power efficiency is improved by about 2.56% ((1.0206 watts/39.9 watts)×100).

The battery 200 is charged by two major modes; specifically, a "run and charging" mode wherein the battery 200 is charged regardless of the run of the computer system, and a "run or charging" mode in which the battery 200 is charged depending on the run of the computer system. Suppose that a current of about 1 amp is supplied from the AC adaptor 100 in the case of the "run and charging" mode and that a current of about 2.1 amps is supplied from the AC adaptor 100 in the case of the "run or charging" mode.

Under this condition, a power dissipation P and a power loss rate η by the diode D20 and the transistor QF5 in the battery charging circuit 400 will be calculated as follows.

1) The "run and charging" mode, $$P_{D20} = V \times I = 0.5 \text{ V} \times 1 \text{ A} = 0.5 \text{ W}$$

$$\eta_{D20} = \frac{0.5 \text{ W}}{39.9 \text{ W}} \times 100 = 1.25\%$$

$$P_{QF5} = 0.014 \text{ V} \times 1 \text{ A} = 0.014 \text{ W}$$

$$\eta_{QF5} = \frac{0.014 \text{ W}}{39.9 \text{ W}} \times 100 = 0.04\%$$

2) The "run or charging" mode, $$P_{D20} = V \times I = 0.5 \text{ V} \times 2.1 \text{ A} = 1.05 \text{ W}$$

$$\eta_{D20} = \frac{1.05 \text{ W}}{39.9 \text{ W}} \times 100 = 3.63\%$$

$$P_{QF5} = 0.014 \text{ V} \times 2.1 \text{ A} = 0.0294 \text{ W}$$

$$\eta_{QF5} = \frac{0.0294 \text{ W}}{39.9 \text{ W}} \times 100 = 0.07\%$$

By using the battery charging circuit 400 according to the present invention, in the case of the "run and charging" mode, a power dissipation is reduced by about 0.486 watts (0.5 watts−0.014 watts) (for example, a power efficiency is improved by about 1.22% ((0.486 watts/39.9 watts)×100)). In the case of the "run or charging" mode, a power dissipation is reduced by about 1.0206 watts (1.05 watts−0.0294 watts). That is, a power efficiency is improved by about 2.55% ((1.0206 watts/39.9 watts)×100).

In the case of the "run and charging" mode, a total power dissipation $P_{t1}$ by the diodes D1 and D20 is about 1.55 watts (1.05 watts($P_{D1}$)+0.5 watts($P_{D20}$)) and a total power loss rate $\eta_{t1}$ by the diodes D1 and D20 is about 3.88% ((1.55 watts/39.9 watts)×100). A total power dissipation $P_{t2}$ by the transistors QF1 and QF5 is about 0.0434 watts (0.0294 watts($P_{QF1}$)+0.014 watts($P_{QF5}$)), and a total power loss rate $\eta_{t2}$ of the transistors QF1 and QF5 is about 0.1% ((0.434 watts/39.9 watts)×100). Therefore, a total power dissipation is reduced by 1.5 watts. This enables the wattage of the AC adaptor 100 to be reduced to 38.4 watts from 39.9 watts.

In the case of the "run or charging" mode, a total power dissipation $P_{t3}$ by the diodes D1 and D20 is about 2.1 watts (1.05 watts($P_{D1}$)+1.05 watts($P_{D20}$)) and a total power loss rate $\eta_{t3}$ of the diodes D1 and D20 is 5.26% ((2.1 watts/39.9 watts)×100). A total power dissipation $P_{t4}$ by the transistors QF1 and QF5 is about 0.0588 watts (0.0294 watts($P_{QF1}$)+ 0.0294 watts($P_{QF5}$)), and a total power loss rate $\eta_{t4}$ of the transistors QF1 and QF5 is about 0.15% ((0.0588 watts/39.9 watts)×100). Therefore, a total power dissipation is reduced by 2.04 watts. This enables the wattage of the AC adaptor 100 to be reduced to 37.86 watts from 39.9 watts.

Furthermore, a heat generated by the computer system is also reduced. Temperature values by each component measured according to the aforementioned condition, that is, 39.9 watts/2.1 amps, 1 amp (the "run and charging" mode) and 2.1 amps (the "run or charging" mode), under the room temperature are shown in the following tables. The room temperature is considered to be 26 degrees Celsius (26° C.).

TABLE 1

|  | the related art | | the present invention | |
|---|---|---|---|---|
|  | Run&Charging | Run or Charging | Run&Charging | Run or Charging |
| D1 | 144° C. | 144° C. | 26° C. |  |
| D20 | 85.7° C. | 144° C. | 26° C. |  |
| QF1 |  |  | 27.7° C. |  |
| QF5 |  |  |  | 34.8° C. |

(each temperature comprises the room temperature)

TABLE 2

|  | the related art | | the present invention | |
|---|---|---|---|---|
|  | Run&Charging | Run or Charging | Run&Charging | Run or Charging |
| D1 | Δ118° C. | Δ118° C. | 0° C. | 0° C. |
| D20 | Δ58° C. | Δ118° C. | 0° C. | 0° C. |
| QF1 |  |  | Δ1.7° C. |  |
| QF5 |  |  |  | Δ8.8° C. |
| sum | 176° C. | 236° C. | 1.7° C. | 8.8° C. |

(the room temperature is eliminated from each temperature)

As seen in the table 2, a temperature of about 174.3° C. (176° C.−1.7° C.) is made lower during the "run and charging" mode. And the temperature of about 227.2° C. (236° C.−8.8° C.) is made lower during the "run or charging" mode.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A switching apparatus, comprising:
   a first input terminal receiving a first power from a first power supply;
   an output terminal outputting an output power;
   a first diode having a first anode and a first cathode, said first anode being coupled with said first input terminal, said first cathode being coupled with said output terminal;
   a second diode having a second anode and a second cathode said second diode being coupled in parallel with said first diode, said second anode being coupled with said first input terminal, said second cathode being coupled with said output terminal;
   a first transistor having a control electrode, a first electrode of a principal electrically conducting channel connected to said first input terminal and said first and second anodes, and a second electrode of said principal electrically conducting channel connected to said output terminal and said first and second cathodes, a drop voltage across said first and second electrodes being lower than a drop voltage across said first diode;
   a voltage detector detecting when a voltage of said first power is higher than a reference voltage and generating a detection signal as a result of said detecting; and
   a first controller receiving said detection signal and controlling said first transistor in response to said detection signal, said first controller switching said first transistor on and said first power being conveyed to said output terminal via said first transistor when said voltage of said first power is higher than said reference voltage.

2. The apparatus of claim 1, said first controller switching said first transistor off and said first power not being conveyed to said output terminal via said first transistor when said voltage of said first power is lower than said reference voltage.

3. The apparatus of claim 1, further comprising:
   a second input terminal receiving a second power from a second power supply;
   a second transistor coupling said second input terminal and said output terminal;
   said second transistor having a control electrode, a first electrode of a principal electrically conducting channel connected to said second input terminal, and a second electrode of said principal electrically conducting channel connected to said output terminal;
   a third diode having a third anode and a third cathode, said third anode being coupled to said second input terminal, said third cathode being coupled to said output terminal; and
   a second controller receiving said detection signal and controlling said second transistor in response to said detection signal, said second controller switching said second transistor off and said second power not being conveyed to said output terminal via said second transistor when said voltage of said first power is higher than said reference voltage.

4. The apparatus of claim 2, further comprising:
   a second input terminal receiving a second power from a second power supply;
   a second transistor coupling said second input terminal and said output terminal;
   said second transistor having a control electrode, a first electrode of a principal electrically conducting channel connected to said second input terminal, and a second electrode of said principal electrically conducting channel connected to said output terminal;
   a third diode having a third anode and a third cathode, said third anode being coupled to said second input terminal, said third cathode being coupled to said output terminal; and
   a second controller receiving said detection signal and controlling said second transistor in response to said detection signal, said second controller switching said second transistor off and said second power not being conveyed to said output terminal via said second transistor when said voltage of said first power is higher than said reference voltage.

5. The apparatus of claim 4, said second controller switching said second transistor on and said second power being conveyed to said output terminal via said second transistor when said voltage of said first power is lower than said reference voltage.

6. The apparatus of claim 5, said said second power being conveyed to said output terminal via said first and second electrodes of said principal electrically conducting channel of said second transistor when said voltage of said first power is lower than said reference voltage.

7. The apparatus of claim 5, said first power supply outputting alternating current power.

8. The apparatus of claim 7, said second power supply corresponding to a battery.

9. The apparatus of claim 1, wherein said first diode is selected from the group consisting of a Schottky diode and a fast recovery diode.

10. A computer system, comprising:
    a system load including a memory;
    an alternating current unit outputting a first power;
    a battery outputting a second power;
    a power supply line being coupled to said system load, and supplying a voltage to said system load;
    a first diode being coupled to said power supply line, said first diode having a first anode and a first cathode, said first anode being coupled to said alternating current unit, said first cathode being coupled to said power supply line;
    a second diode having a second anode and a second cathode, said second diode being coupled in parallel with said first diode, said second anode being coupled to said alternating current unit, said second cathode being coupled to said power supply line;
    a first transistor having a control electrode, a first electrode of a principal electrically conducting channel connected to said alternating current unit, and a second electrode of said principal electrically conducting channel connected to said power supply line, a drop voltage across said first and second electrodes being lower than a drop voltage across said first diode;
    a voltage detector detecting when a voltage of said first power is higher than a reference voltage and generating a detection signal as a result of said detecting;
    a first controller receiving said detection signal and controlling said first transistor in response to said detection signal, said first controller switching said first transistor on and said first power being conveyed to said power supply line via said first transistor when said voltage of said first power is higher than said reference voltage;

a second transistor coupling said battery to said power supply line; and a second controller receiving said detection signal and controlling said second transistor in response to said detection signal, said second controller switching said second transistor off and said second power not being conveyed to said power supply line via said second transistor when said voltage of said first power is higher than said reference voltage.

11. The apparatus of claim 10, said second controller switching said second transistor on and said second power being conveyed to said power supply line via said second transistor when said voltage of said first power is lower than said reference voltage.

12. The apparatus of claim 10, said first controller switching said first transistor off to prevent electrical power from being transferred via said first transistor when said voltage of said first power is lower than said reference voltage.

13. The apparatus of claim 10, said alternating current unit receiving an alternating current power and outputting a first direct current power, said battery outputting a second direct current power, said first power corresponding to said first direct current power, said second power corresponding to said second direct current power.

14. The apparatus of claim 10, said system load further comprising a display unit conveying varying visual information to a user, wherein said display unit is selected from the group consisting of a cathode ray tube, a liquid crystal display, a gas-plasma display, a light emitting diode display, an electroluminescent display, and a field emission display.

15. A battery charging apparatus, comprising:

a first terminal being coupled to an external power supply;

a second terminal being coupled to a battery;

a first diode coupling said first terminal to said second terminal, said first diode preventing a current back flow from said battery to said external power supply, said first diode having a first anode and a first cathode, said first anode being coupled to said first terminal, said first cathode being coupled to said second terminal;

a first switch coupling said first terminal to said second terminal, said first switch having a drop voltage lower than a drop voltage of said first diode, said first switch being coupled with said first diode, said first switch further comprising:

a second diode having a second anode and a second cathode, said second diode being coupled in parallel with said first diode, said second anode being coupled to said first terminal, said second cathode being coupled to said second terminal; and a first transistor having a control electrode, a first electrode of a principal electrically conducting channel connected to said first terminal and to said first and second anodes, and a second electrode of said principal electrically conducting channel connected to said second terminal and to said first and second cathodes;

a current detector detecting a charging current output from said external power supply and generating a detection signal as a result of said detecting; and a first switch controller receiving said detection signal and controlling said first switch in response to said detection signal, said first switch controller switching said first switch on and said charging current being conveyed from said external power supply to said battery via said first switch when said charging current is detected.

16. The apparatus of claim 15, said first switch controller switching said first switch off when said charging current is not detected.

17. The apparatus of claim 16, said charging current being conveyed from said external power supply to said battery via said principal electrically conducting channel of said first switch when said charging current is detected.

18. An electrical apparatus, comprising:

a first unit outputting a first power;

a battery outputting a second power;

a charging circuit supplying a charging current from said first unit to said battery; and a switch unit receiving said first power from said first unit and receiving said second power from said battery, said switch unit further comprising:

a first input terminal receiving said first power from said first unit;

a second input terminal receiving said second power from said battery;

an output terminal outputting a power selected from among said first and second powers;

a first diode being coupled between said first input terminal and said output terminal;

a first switch being coupled in parallel with said first diode, said first switch having a drop voltage lower than a drop voltage of said first diode;

a voltage detector detecting when a first voltage of said first power is higher than a reference voltage, and generating a detection signal corresponding to said detecting; and a first switch controller receiving said detection signal and controlling said first switch in response to said detection signal, said first switch controller switching said first switch on and said first power being conveyed to said output terminal via said first switch when said first voltage of said first power is higher than said reference voltage; said charging circuit further comprising:

an input connector being coupled to said first unit;

an output connector being coupled to said battery;

a second switch having a first end being coupled to said input connector and a second end being coupled to said output connector, said second switch coupling said input connector to said output connector, a voltage drop between said first and second ends corresponding to a first voltage drop;

a second diode having an anode and a cathode, said diode being coupled to prevent a current back flow from said battery to said first unit, a voltage drop between said anode and said cathode corresponding to a second voltage drop, said first voltage drop being lower than said second voltage drop;

a current sensor sensing when said charging current from said first unit is provided, and generating a sensor signal corresponding to said sensing; and a second switch controller receiving said sensor signal and controlling said second switch in response to said sensor signal, said second switch controller switching said second switch on and said charging current being conveyed from said first unit to said battery via said second switch when said charging current is sensed; said switch unit further comprising:

a third switch coupling said output terminal to said battery; and a third switch controller receiving said detection signal and controlling said third switch in response to said detection signal said third switch controller switching said third switch off and said second power not being conveyed to said output terminal via said third switch when said first voltage of said first power is higher than said reference voltage.

19. The apparatus of claim 18, said first switch further comprising a first transistor having a control electrode, a first electrode of a principal electrically conducting channel connected to said first input terminal, and a second electrode of said principal electrically conducting channel connected to said output terminal, said first switch controller switching said first transistor on and said first power being conveyed to said output terminal via said principal electrically conducting channel when said first voltage of aid first power is higher than said reference voltage.

20. The apparatus of claim 18, said first, second, and third switch corresponding to a separately located first, second, and third field-effect transistor, respectively.

* * * * *